I. H. SHAMBAUGH.
CALENDAR.
APPLICATION FILED MAY 4, 1915.

1,264,213.

Patented Apr. 30, 1918.
2 SHEETS—SHEET 1.

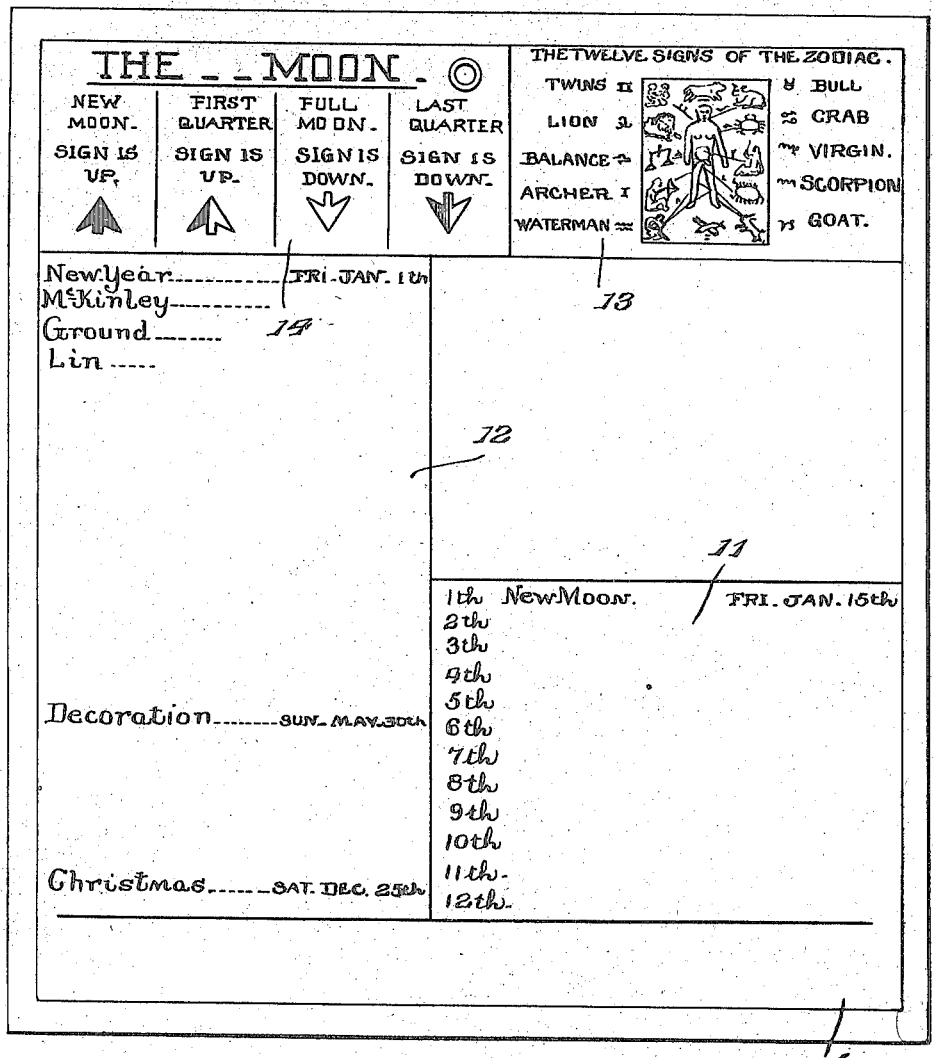
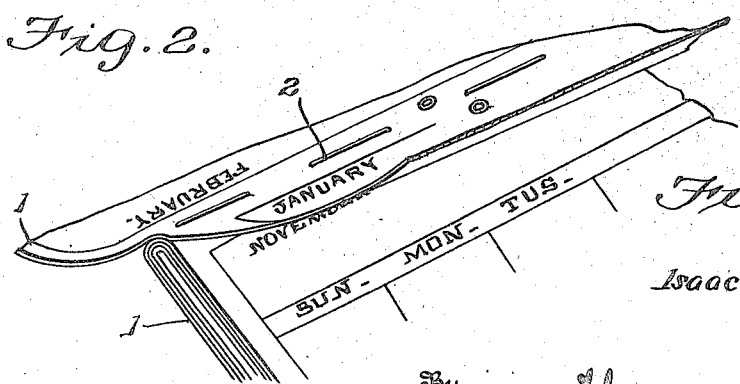
Fig. 2.
Fig. 3.
Inventor
Isaac H. Shambaugh.

UNITED STATES PATENT OFFICE.

ISAAC H. SHAMBAUGH, OF AVILLA, INDIANA.

CALENDAR.

1,264,213.

Specification of Letters Patent.  Patented Apr. 30, 1918.

Application filed May 4, 1915. Serial No. 25,760.

*To all whom it may concern:*

Be it known that I, ISAAC H. SHAMBAUGH, a citizen of the United States residing at Avilla, in the county of Noble and State of Indiana, have invented certain new and useful Improvements in Calendars, of which the following is a specification.

This invention relates to calendars, and its object is to provide a calendar which may be used through an entire year or other period of time without presenting the bulky appearance of calendars now commonly used.

The invention also seeks to provide a calendar which may be readily adjusted at the end of each month or other period of time to present data corresponding to a succeeding period, and the invention also seeks to provide a calendar in which the moon's phases will be accurately indicated throughout the period for which the calendar is designed.

Other incidental objects of the invention will appear as the description of the same proceeds, and the invention resides in certain novel features which will be particularly pointed out in the claims following the description.

In the accompanying drawings, which fully illustrate my improved calendar:—

Fig. 2 is a face view of the backing or filler sheet; and

Fig. 3 is an enlarged detail perspective view showing the arrangement of the date sheet or leaves and the manner of securing them together.

Figure 1:
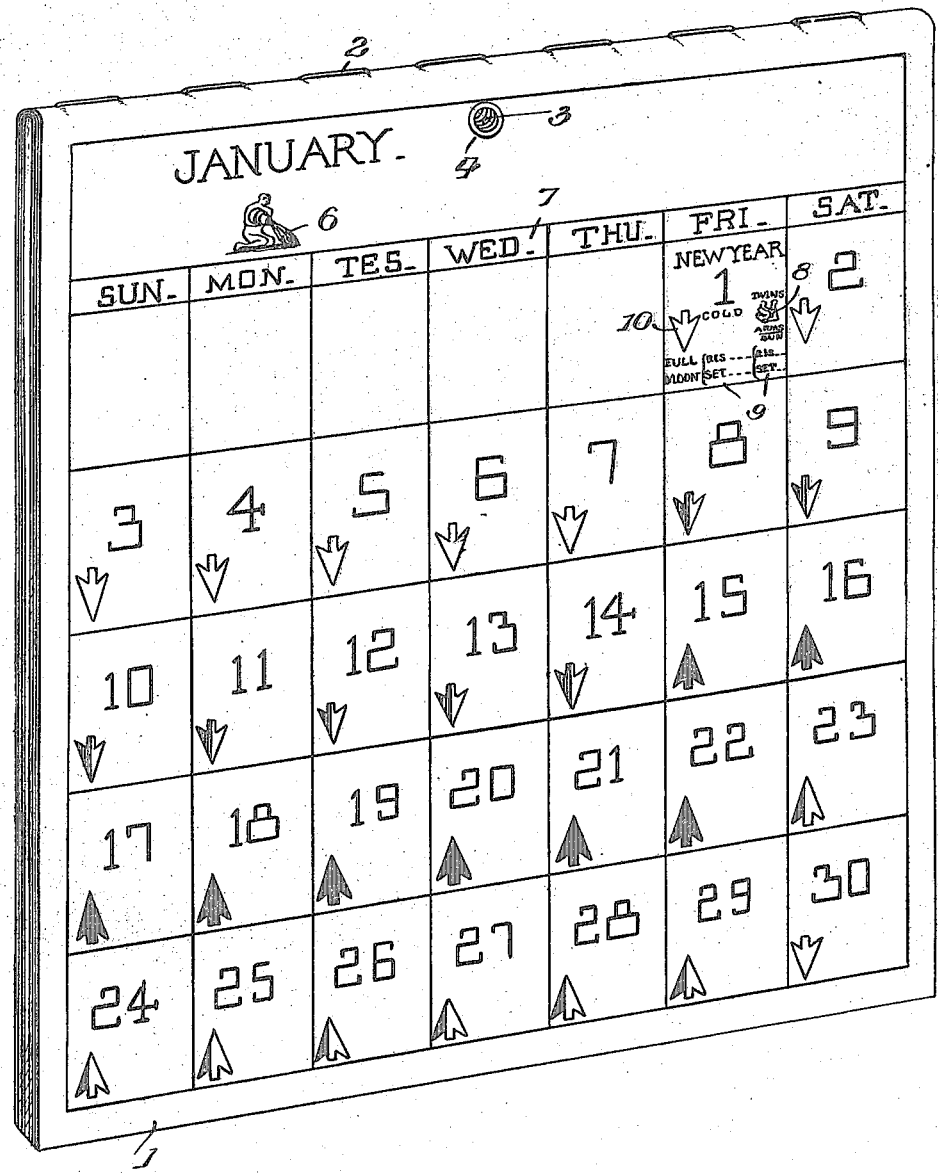
Figure 1 is a perspective view of a calendar arranged for use.

In carrying out my invention, I employ a plurality of sheets 1 which are secured together transversely at their centers by stitches 2 or some equally convenient and inexpensive means. Each sheet has printed or otherwise displayed thereon the numerals and abbreviations or words necessary to indicate the days of four months, the indications for two months being printed on each side of the sheet and arranged at the opposite ends thereof.

Referring to Fig. 3 more particularly, it will be noted that the sheet which there appears as the outside sheet has the days of the month of January printed upon its outer face at one end, and upon the same face at the opposite end displays the proper designations for the days of the month of February. The days for the month of November appear in this figure below that portion of the sheet containing the designations for the month of January, and it will thus be readily understood that the designations for the month of December are printed upon the end of the outermost sheet which also displays the month of January but upon the inner face of said sheet, while upon that end of the same sheet which is used to give the days of the month of February, but upon the inner face of the same, will be printed the proper characters for the month of March.

Through the several sheets near the stitches 2, I form openings 3 which may be reinforced by an eyelet 4 and which are adapted to engage over a hook or other suspending device. It will be readily noted upon reference to Figs. 1 and 3, that the several sheets are folded along the line of stitches and, when the calendar is in display position, as shown in Fig. 1, all the days of one month will be exposed to view. Within the fold of the sheets, I insert a backing or filler sheet 5 which is preferably of cardboard or some other material which will possess some degree of rigidity without considerable weight, the said backing or filler sheet serving to prevent sagging of the date sheets or leaves at the corners of the same and also serving to prevent wear upon the openings through the several sheets by the suspending hook.

In Fig. 1, I show the date sheet intended for display during the month of January. It will be noted that the name "January" appears at the top of the sheet near the left hand side of the same, and at the right hand side of the sheet is left a blank space in which may be displayed the number of the year or advertising matter. Below the word "January" appears a sign of the zodiac, as shown at 6, and it is to be understood that the sign of the zodiac corresponding to each month will be placed upon the sheet for that month. The numbers corresponding to the days of the month are arranged chronologically in horizontal rows and vertical columns, the names of the days of the week appearing at the top of the columns, as shown at 7. In the space allotted to each day, although for convenience I show the matter in only one space, I will display the sign of the zodiac, as indicated at 8, and will also display information giving the time of the rising and setting of the sun and the moon, as shown at 9. I will also display in each of said spaces an arrow or spear head, indicated at 10, which will point upwardly or downwardly according to the phases of the moon at the respective dates indicated. During the full moon, the arrow or spear head will appear in outline only and will point downwardly. During the last quarter the arrow head will point downwardly but one side only will be in outline while the other side will be shaded or otherwise darkened. During the period of the new moon, the arrow head will point upwardly and will be dark or appear in solid shading, and during the first quarter the arrow head will point upwardly but will have one side light and the other side dark.

The backing or filler sheet 5 may be used to convey desired information, such as the dates of each succeeding new moon throughout the year, as indicated in the column 11, and may also display the dates of legal holidays or other days which are the occasion of special observance, as indicated at 12. At the top of the backing or filler sheet I will display the several signs of the zodiac, as shown at 13, and will also display an explanation of the use of the arrow or spear heads, as shown at 14.

It is thought the manner of using my calendar will be readily understood. At the beginning of the year, the calendar is displayed, as indicated in Fig. 1. At the beginning of the month of February, the calendar is lifted from the suspending hook and merely turned around so that the previously displayed face will become the back and the face which was previously the back will become the front face and display the days of the month of February, as will be readily understood upon reference to Fig. 3. At the beginning of the month of March, the calendar is lifted from the suspending hook and the outside sheet is folded along the line of stitches 2, the backing or filler sheet being first withdrawn and placed against said outside sheet so that when said sheet is folded the fold will be along the upper edge of the filler sheet. At the beginning of the month of April the calendar is merely lifted off the suspending hook and reversed in the same manner that it was reversed at the beginning of the month of February.

It will thus be seen that I employ a minimum number of sheets for the display of all the days throughout the year and overcome the necessity of tearing off a sheet at the end of each month. It is frequently desirable to refer back to a past date, and this may be readily accomplished by the use of my calendar inasmuch as the sheets for the expired month are retained.

My improved calendar is not bulky and may be produced at a slight cost and when in use will accurately define the phases of the moon throughout the year and thus impart needed information to sea-going persons or other persons who may have special use for the same. Beginning with the new moon and extending through the first quarter, the arrow or spear head will point upwardly, and beginning with the full moon and extending through the last quarter, the arrow or spear head will point downwardly. When the arrow or spear head is dark or shaded, it is in the dark of the moon and when the arrow or spear head is not shaded it is in the light of the moon.

The filler sheet, as before stated, is of cardboard or some other material which is stiff relatively to the date sheets and, therefore, serves as a support to the calendar and prevents sagging of the same at the corners. The opening 3, which is the point of suspension, is below the fold so that the weight of the calendar is not thrown on the stitches which, consequently, are not apt to cut through the sheets.

Having thus described the invention, what is claimed as new is:—

1. A calendar comprising a plurality of relatively thin sheets disposed with their edges in registration and all folded along a line corresponding to the transverse median line of each sheet, said sheets being permanently united at their line of fold in a manner to permit their backward and forward overfolding on the said line, all of said sheets being provided with openings disposed at opposite sides of the line of fold, and a relatively stiff removable filler sheet interposed between certain of the thin sheets and having a corresponding opening formed therein, the openings of all of the sheets being designed to aline with one another in all folded conditions of the sheets to permit the passage of a suspension device, whereby when the calendar is hung from said suspension device the filler sheet will be held against accidental displacement.

2. A calendar comprising a series of relatively thin sheets folded transversely at their centers and permanently secured along the fold, said sheets being provided with registering openings located immediately below the line of fold and each sheet bearing calendar indicia, and a relatively stiff removable filler sheet interposed between certain of the thin sheets and bearing indicia explanatory of the indicia on said thin sheets, said filler sheet being provided with an opening adapted to register with the openings in the thin sheets to accommodate a suspension device, whereby when the calendar is hung from said suspension device the filler sheet will be held against accidental displacement.

In testimony whereof I affix my signature in presence of two witnesses.

ISAAC H. SHAMBAUGH. [L. S.]

Witnesses:
 HARVEY A. MOORE,
 CARL C. MCKEE.